United States Patent [19]
Govorkov

[11] Patent Number: 6,044,094
[45] Date of Patent: Mar. 28, 2000

[54] LASER SYSTEM WITH OPTICAL PARAMETRIC OSCILLATOR

[75] Inventor: Sergei V. Govorkov, Boca Raton, Fla.

[73] Assignee: Inrad, Northvale, N.J.

[21] Appl. No.: 08/820,601

[22] Filed: Mar. 19, 1997

[51] Int. Cl.[7] .................................................. H01S 3/10
[52] U.S. Cl. ............................................................ 372/21
[58] Field of Search ......................................... 372/21, 22

[56] References Cited

U.S. PATENT DOCUMENTS 5,260,953  11/1993  Rowe ........................................ 372/21

Primary Examiner—Hemang Sanghavi
Assistant Examiner—Robert E. Wise
Attorney, Agent, or Firm—Stroock & Stroock & Lavan LLP

[57] ABSTRACT

A laser device which is tunable within the mid-IR range is provided. The device includes a thin etalon, formed as an uncoated plane-parallel plate of high refractive index material, which is transparent for both pump and resonant (signal, idler or both) radiation, for coupling the pump beam to the cavity of an optical parametric oscillator. Such an optical element does not require thin film optical coatings and inherently possesses a high optical damage threshold. Furthermore, high reflectivity at the pump wavelength and high transmittance for oscillating radiations are provided, by orienting the etalon at the Brewster angle. Examples of such materials include silicon and germanium, which are transparent at wavelengths longer than approximately 1 $\mu$m and 2 $\mu$m, respectively, and have refractive indices of n=3.4 and n=4.0, respectively.

30 Claims, 6 Drawing Sheets

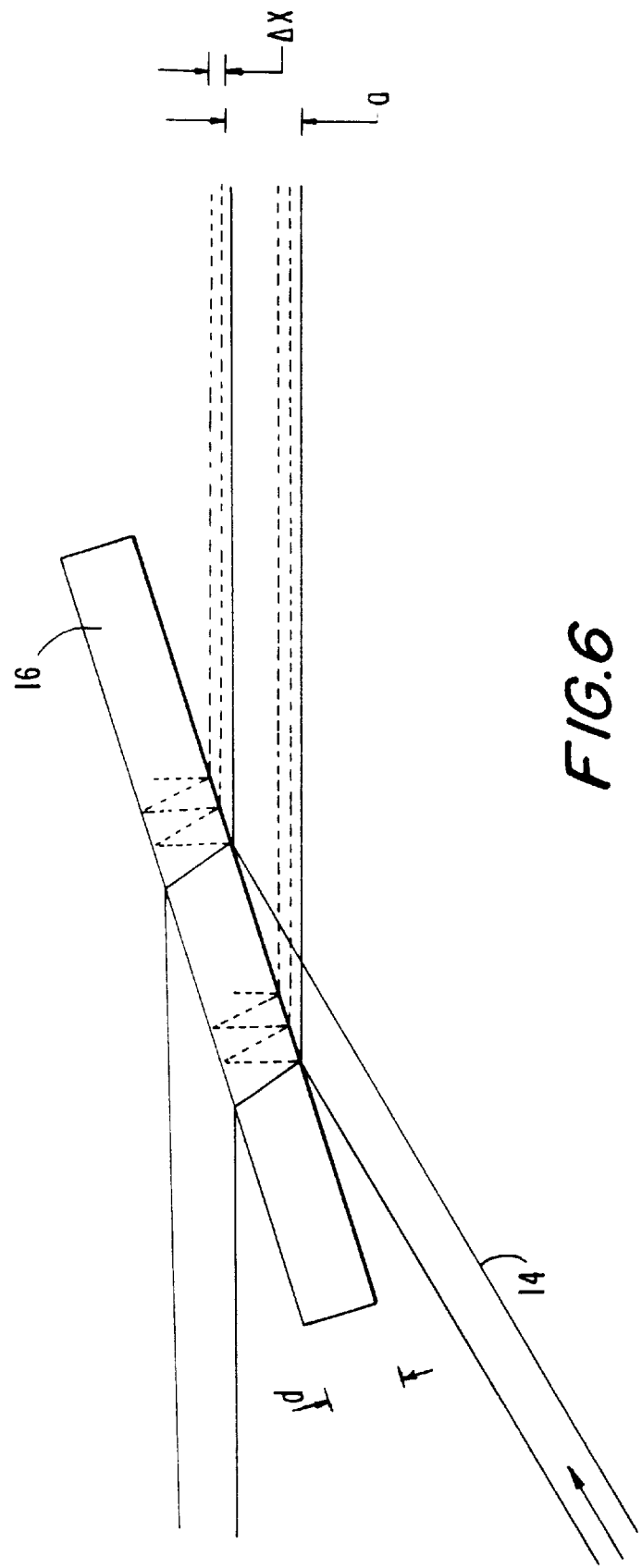

LASER SYSTEM WITH OPTICAL PARAMETRIC OSCILLATOR

BACKGROUND OF THE INVENTION

The invention relates generally to optical parametric oscillators (OPOs) and more particularly to a continuously tunable OPO operated in the near infrared range.

Optical parametric oscillators have been recognized as useful to effect the efficient conversion of fixed wavelength pump laser radiation into broadly wavelength tunable radiation. Thus, OPOs can provide an efficient source of high power coherent radiation at wavelengths which are not covered well by conventional lasers.

The applications of OPOs are numerous and include spectroscopy, environmental monitoring, remote sensing, chemical process control, and so forth. OPOs which operate in the ultraviolet (UV), visible and near infrared (IR) ranges are described in a number of publications. However, analytical and remote sensing applications, and others, would benefit greatly from the ability to extend the operating spectral range of OPOs to the mid-IR range, i.e., from roughly 3 $\mu$m to about 10–15 $\mu$m, because this range contains characteristic rotational-vibrational absorption bands of a large number of molecules, as well as "transparency windows" of the atmosphere.

Unfortunately, the operation of currently existing OPOs in this mid-IR range is limited by several factors, such as: (i) the unavailability of nonlinear crystals with sufficient transparency and birefringence at longer wavelengths; and (ii) the unavailability or poor performance (most notably, a low optical damage threshold) of existing optical elements such as mirrors, beamsplitters, etalons and so forth, designed for this spectral range.

Several groups have reported laboratory versions of OPOs and the contents of the following publications are incorporated herein by reference: (1) Knights, M. G., et al. "Multiwatt mid-IR optical parametric oscillator using $ZnGeP_2$", Advanced Solid State Laser Conference (Salt Lake City, Utah, 1994); (2) Vodopyanov, K. L., et al., "Extrawide tuning range IR optical parametric generators", Conf. on Lasers and Electro-optics, 1996 OSA Technical Digest, pp. 334–344, (Optical Society of America, Washington, D.C. 1996); (3) Fan, Y. X., et al. "$AgGaS_2$ infrared parametric oscillator", Appl. Phys. Letts., v.45, #4, 1984, pp. 313–315; (4) Elsaesser, T., et al. "Parametric generation of tunable picosecond pulses in the medium infrared using $AgGaS_2$ crystals", Appl. Phys. Letts., v. 44, #4, 1984, pp. 383–385; (5) Cheung, E. C., et al. "Silver Thiogallate, singly resonant optical parametric oscillator pumped by a continuous-wave mode-locked Nd:YAG laser", Optics Letters, v.19, #9, 1994, pp. 631–633; (6) Eckardt, R. C., et al. Broadly tunable infrared parametric oscillator using $AgGaSe_2$", Appl. Phys. Letts., v. 49, #11, 1986, pp. 608–610; (7) Budni, P. A, et al., "Kilohertz $AgGaSe_2$ optical parametric oscillator pumped at 2 $\mu$m, Optics Letts., v.18, #13, 1993, pp. 1068–1070; (8) Grasser, C., "ontinuous-wave mode-locked operation of a picosecond $AgGaSe_2$ optical parametric oscillator in the mid infrared", Advanced Solid State Lasers, Technical Digest, OSA, 1996, pp. WD4-1–WD4-3; (9) Born, M., Wolf, E., "Principles of Optics" (Pergamon Press, Oxford, 1968). However, the performance of these laboratory OPOs suffers from problems relating to insufficient damage resistance and inefficient optical elements.

Parametric conversion is a second order nonlinear process and therefore, conversion efficiency and oscillation threshold depend on the intensity of the pump and oscillating beams. Therefore, the maximum achievable intensity is limited in many situations by the onset of damage to the optical elements.

The low threshold to damage of the optical elements employed in the foregoing laboratory OPOs in the mid-IR range makes it difficult to achieve sufficiently narrow spectral line width of the generated beams. This is, in part, because line narrowing elements in the OPO cavity introduce significant energy loss. This energy loss is then compensated for by increasing the pump intensity. OPOs reported in the foregoing references 1–8 produce relatively broad band output radiation, typically significantly wider than 10 $cm^{-1}$ which is insufficient for many applications, such as to resolve the rotational-vibrational spectra of molecular gases.

The design of optical elements formed with multi-layer thin film coatings suitable for the mid-IR range presents several significant technological challenges. For example, many optical materials commonly used in UV, visible and near-IR ranges (such as Si, Hf, Ti, and Zr oxides) exhibit strong absorption beyond 3 $\mu$m. Also, commonly used optical materials which are transparent, such as $ThF_4$ and ZnSe, are insufficiently damage resistant. In addition, multilayered thin film coatings tend to be porous as an inherent result of the deposition process and therefore readily accumulate moisture, which becomes trapped at the surface irregularities and inside the thin films. Consequently, the strong absorption of water in the mid-IR range can cause a significant decrease of the laser damage threshold and in many instances, prevent the proper operation of the OPO.

Some precautions can be taken to reduce the water content in the coatings to provide significant improvements in the resistance of the optical elements to laser damage. These include operating the OPO in a dry atmosphere and/or keeping critical optical elements at a slightly elevated temperature, to drive off absorbed water. However, these measures increase the complexity of the device and make operating the device more cumbersome. Moreover, even these measures do not sufficiently improve the results for thick multi-layered coatings, which tend to have a more developed columnar structure.

U.S. Pat. No. 5,033,057, the contents of which are incorporated herein by reference, describes a cavity with separate dichroic pump steering mirrors, which couple the pump beam in-and-out of the cavity. Nevertheless, these dichroic steering mirrors require multi-layer thin film dielectric coating processes. This presents drawbacks, such as those described above, and limits the performance of the OPO. In addition, the input steering mirror is described as being positioned at the location of the highest intensity in the OPO cavity, because it is exposed to the incoming pump radiation as well as to the generated signal and idler beams.

Accordingly, it is desirable to provide an improved laser device including an optical parametric oscillator, capable of operating efficiently in the mid-IR range.

SUMMARY OF THE INVENTION

Generally speaking, in accordance with the invention, a laser device which is tunable within the mid-IR range is provided. The device includes a thin etalon, formed as an uncoated plane-parallel plate of high refractive index material, which is transparent for both pump and resonant (signal, idler or both) radiation, for coupling the pump beam to the cavity of an optical parametric oscillator. Such an optical element does not require thin film optical coatings and inherently possesses a high optical damage threshold.

Furthermore, high reflectivity at the pump wavelength and high transmittance for oscillating radiations are provided, by orienting the etalon at the Brewster angle. Examples of such materials include silicon and germanium, which are transparent at wavelengths longer than approximately 1 μm and 2 μm, respectively, and have refractive indices of n=3.4 and n=4.0, respectively.

The cavity can also include nonlinear crystals and a cavity end mirror. The nonlinear crystals should be antireflectively (AR) coated. Because AR coatings require relatively few coating layers, compared to the coatings needed to form a highly reflective beam coupler, and are therefore much more robust, there is less of a problem with damage threshold. Moreover, the highly reflective end cavity mirror is not exposed to the high intensity pump radiation, and therefore, the requirements for its design are relatively simple. Highly reflective gold and silver films can be employed.

Accordingly, it is desirable to provide a laser device which is tunable in the mid-IR range, which overcomes drawbacks of the prior art.

Another object of the invention is to provide a method of producing a mid-IR tunable laser beam.

Still another object of the invention is to provide a laser device which is tunable to a more narrow line width.

Yet another object of the invention is to provide a beam coupling device for an OPO, which has increased damage threshold.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is a schematic illustration of the optical beam path in a thin etalon beam coupler of a laser device in accordance with a preferred embodiment of the invention.

DETAILED DESCRIPTION OF THE PREFERRED EMBODIMENTS

Figure 1:
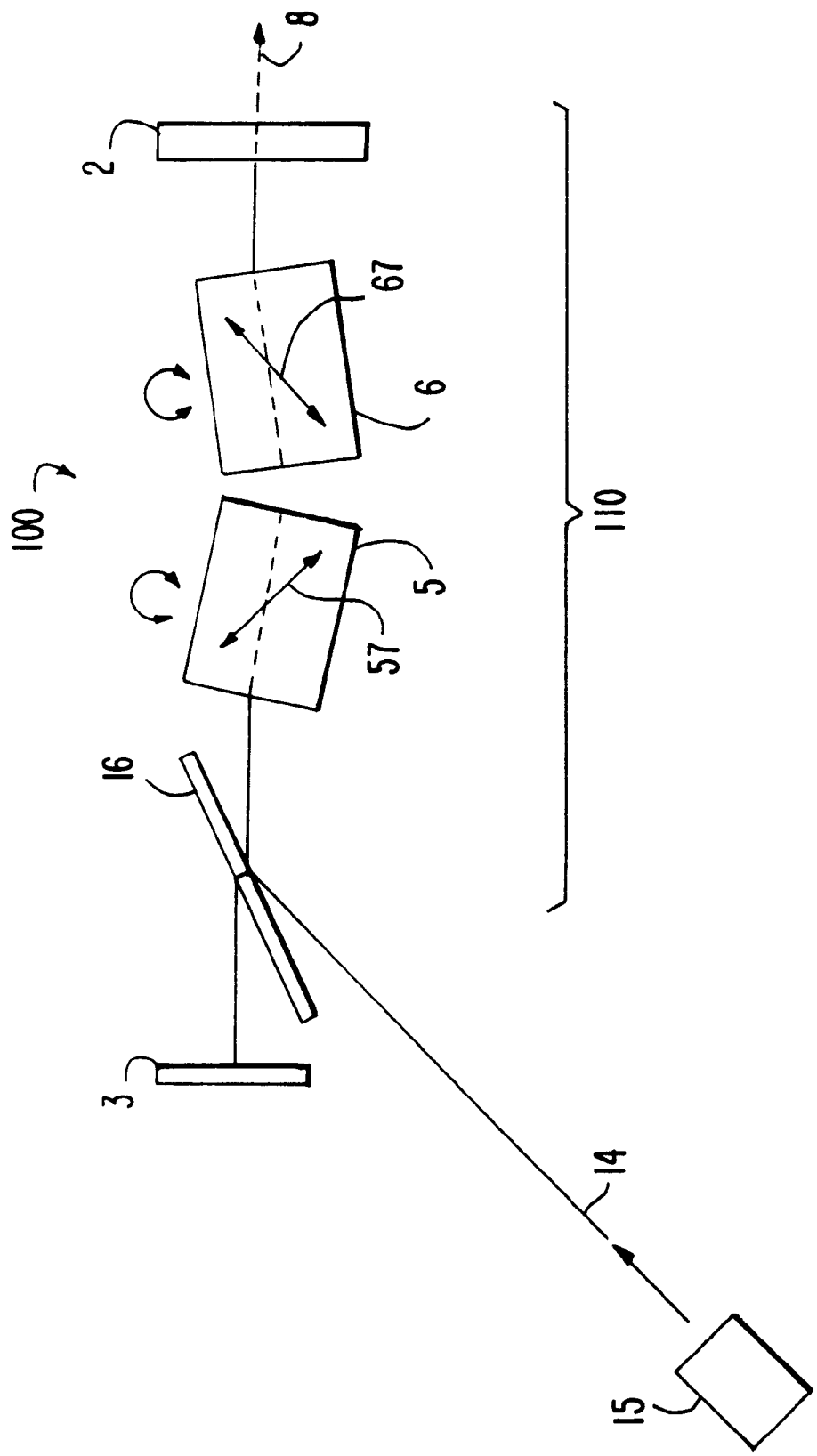
FIG. 1 is a schematic illustration of a laser device including an OPO cavity, constructed in accordance with a preferred embodiment of the invention.
Figure 2:
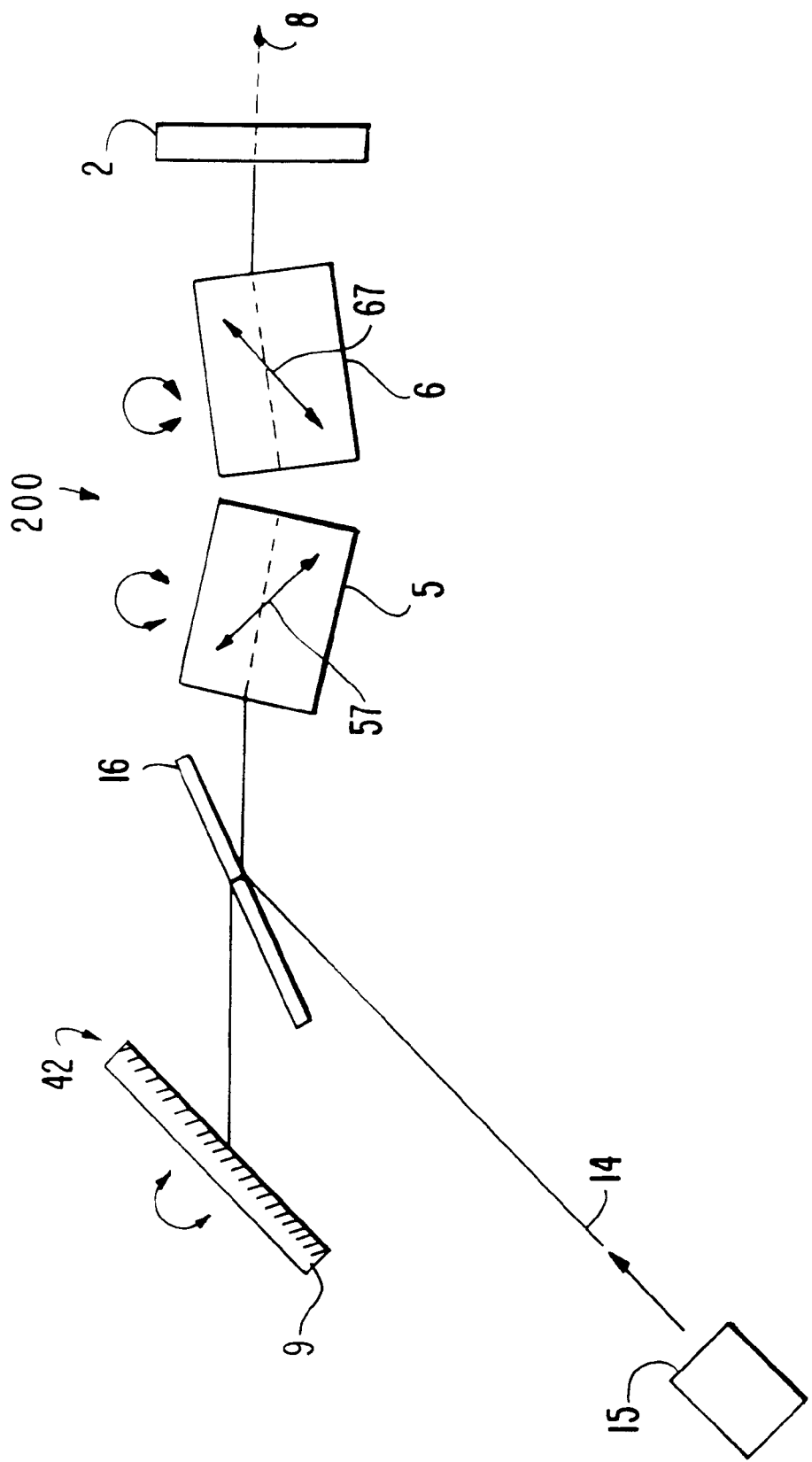
FIG. 2 is a schematic illustration of a laser device including an OPO cavity, constructed in accordance with another embodiment of the invention.

Optical parametric oscillators for laser devices constructed in accordance with preferred embodiments of the invention will be described generally, with reference to FIGS. 1–5, with like elements assigned the same reference numerals.

Referring to FIG. 1, an optical parametric oscillator 100, constructed in accordance with a preferred embodiment of the invention is shown formed with an optical cavity 110 and a pump laser 15 for directing a pump beam 14 into optical cavity 110. Optical cavity 110 includes a first broad band reflective mirror 2 at a front end of the cavity and a second broad band reflective mirror 3 at a rear end thereof.

Mirrors 2 and 3 are mounted with their reflective faces perpendicular to the optical axis of cavity 110 with an oscillating wave 8 reflected therebetween. A pair of nonlinear optical crystals 5 and 6 having optical axes 57 and 67 are mounted between mirrors 2 and 3 in the optical axis of optical cavity 110, such that they can be rotated, in order to achieve phase matching conditions for desired wavelengths of oscillating waves. In alternate embodiments of the invention, one optical nonlinear crystal or more than two optical nonlinear crystals can be employed. The primary function of the crystal or crystals is to produce parametric oscillations. However, the crystals can also assist in coarse wavelength selection. In configurations where two or another even number of crystals are employed, it is preferable that the optical axes of the crystals form complementary angles with the optical axis of cavity 110, such that the walk-off of the extraordinary beam in one crystal is negated by a corresponding walk-off in the other.

Front mirror 2 is preferably reflective in the spectral range covering the wavelengths of the pump beam and both the signal and idler beams, so that the nonlinear interaction of the three beams continues on the return pass. This lowers the oscillation threshold and increases conversion efficiency. Front mirror 2 can be formed with a highly reflective gold or silver coating and can optionally be protected by a dielectric coating. Front mirror 2 is not exposed to the full power of the pump beam. Therefore, the requirements for optical damage threshold resistance are much lower than for those of the beam coupler. Front mirror 2 can be made to be partially reflective at the signal or idler (or both) wavelengths, thus providing out coupling of oscillating waves 8.

Rear mirror 3 is also not exposed to the high intensity pump beam and can be formed of the same materials as front mirror 2. Alternatively, front mirror 2 can be made to reflect only one resonant wave (signal or idler), by using a multilayered dielectric coating. The damage threshold of front mirror 3 typically does not present a problem, because the light intensity at front mirror 3 is significantly lower than at the beam coupler.

Figure 3:
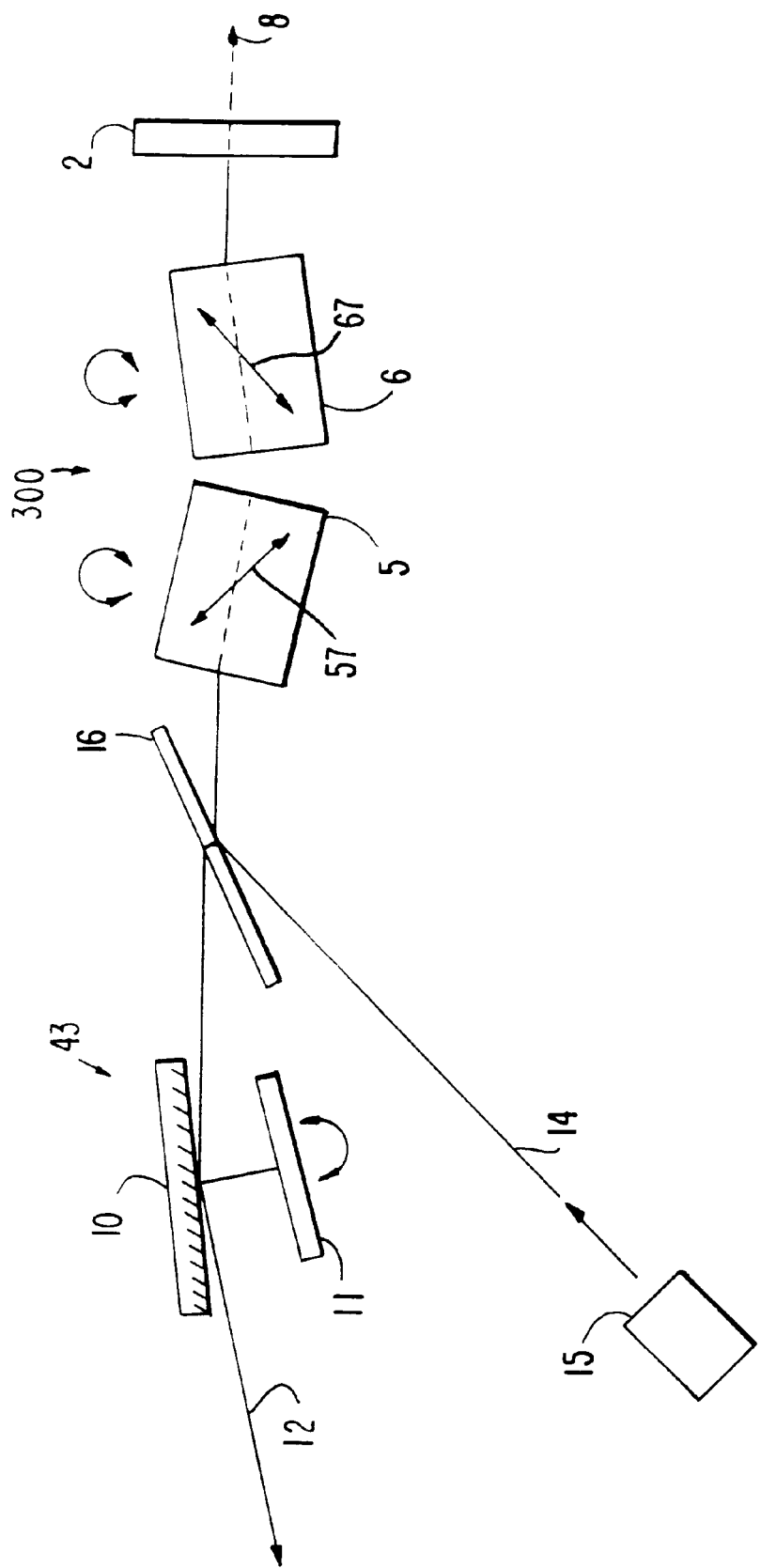
FIG. 3 is a schematic illustration of a laser device including an OPO cavity, constructed in accordance with another embodiment of the invention.
Figure 4:
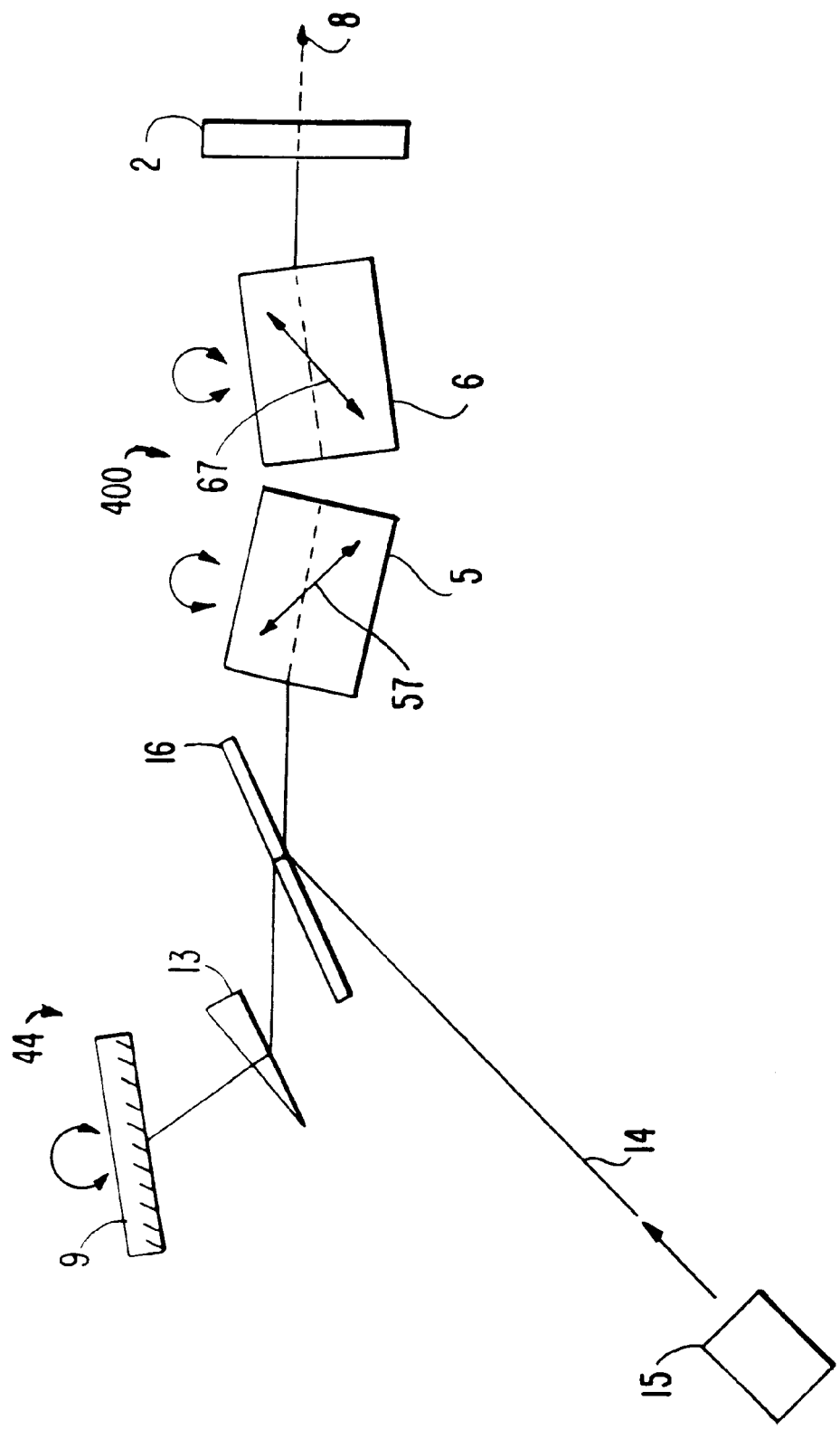
FIG. 4 is a schematic illustration of a laser device including an OPO cavity, constructed in accordance with another embodiment of the invention.
Figure 5:
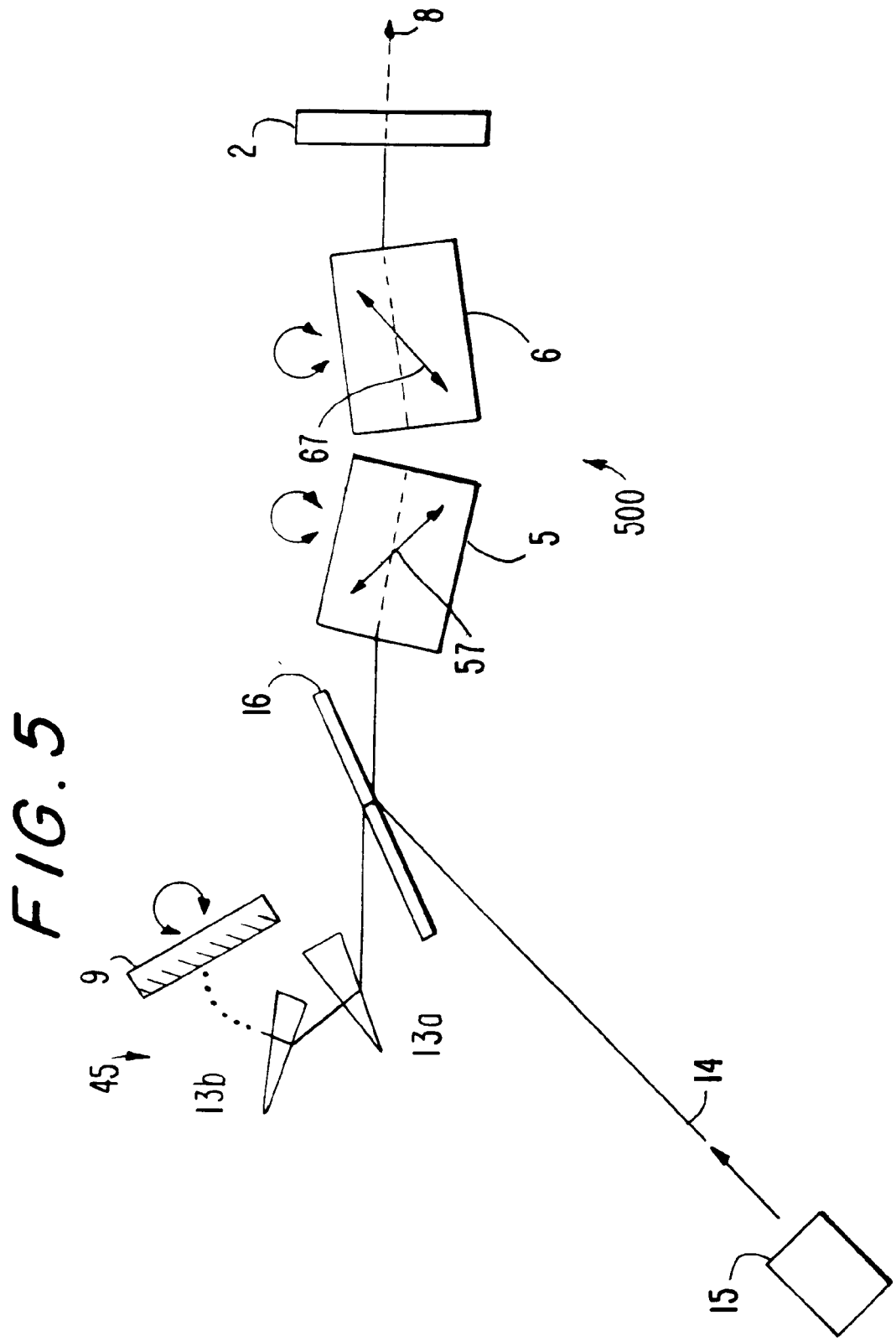
FIG. 5 is a schematic illustration of a laser device including an OPO cavity, constructed in accordance with another embodiment of the invention.

Additional embodiments of the invention are shown generally in FIGS. 2–5, which depict optical parametric oscillators 200, 300, 400 and 500, respectively. These OPOs differ from OPO 100, in that they include a wavelength selective element 42, 43, 44 and 45, respectively, as the rear "reflective" element of the optical cavity. Thus, optical parametric oscillator 200 is similar in construction to OPO 100, except that rear broad band reflective mirror 3 is replaced with wavelength selective element 42, which is a Littrow diffraction grating 9. In FIG. 3, an OPO 300 is formed similar to OPO 100, except that the wavelength selective element 43 is formed with a Littman diffraction grating 10. In FIG. 4, an OPO 400 is shown with a wavelength selective element 44, in which a beam expander 13 is interposed between etalon 16 and Littrow diffraction grating 9 of OPO 300. In FIG. 5, an OPO 500 is shown, in which wavelength selective element 45 includes a pair of beam expanders 13A and 13B, which are interposed between etalon 16 and Littrow diffraction grating 9. In alternative embodiments, additional beam expanders can be employed.

If wavelength selective elements 42, 43, 44 and 45 are used to narrow the spectral line width of the generated wave, single longitudinal mode oscillations can be achieved. Line widths well below 10 cm$^{-1}$ and even below 1 cm$^{-1}$ can be achieved in accordance with the invention. In the case of OPO 200, which employs Littrow diffraction grating 9, wavelength tuning is achieved by rotating grating 9 about the axis parallel to the direction of the grooves in the grating. In the case of OPO 300, employing Littman diffraction grating 10, oscillating waves are returned into the optical cavity by a flat highly reflective mirror 11. Tuning is provided by rotating mirror 11 about an axis parallel to the direction of the grating groups. Out coupling of the oscillating waves is achieved in zero diffraction order of the grading 12. Referring to FIGS. 4 and 5, beam expanders 13, 13A and 13B can be constructed of prisms.

Prisms used with the wavelength selective elements can be formed of various known materials that are transparent in the mid-IR range. It is preferable to employ materials with a high refractive index, such as Si or Ge to provide a higher expansion ratio. Standard diffraction gratings are well known in the industry and are commonly formed of Al coated glass.

As evident from the foregoing, a laser device can be provided, which is tunable within the mid-IR range. The output beam can have an output spectral line width narrower than 10 cm$^{-1}$ and even narrower than 1 cm$^{-1}$ The device includes a thin etalon, formed as an uncoated plane-parallel plate of high refractive index material, which is transparent for both pump and resonant (signal, idler or both) radiation, for coupling the pump beam to the cavity of an optical parametric oscillator. Such an optical element does not require thin film optical coatings and inherently possesses a high optical damage threshold. Furthermore, high reflectivity at the pump wavelength and high transmittance for oscillating radiations are provided, by orienting the etalon at the Brewster angle. Examples of such materials include silicon and germanium, which are transparent at wavelengths longer than approximately 1 $\mu$m and 2 $\mu$m, respectively, and have refractive indices of n=3.4 and n=4.0, respectively. Additional materials include semiconductors of the II–VI or III–V groups, such as ZnSe.

The cavity can also include nonlinear crystals which should be antireflectively (AR) coated and a cavity end mirror. Because AR coatings require relatively few coating layers, compared to the coatings needed to form a highly reflective beam coupler, and are therefore much more robust, there is less of a problem with damage threshold. Moreover, the highly reflective cavity end mirror (or wavelength selective element) is not exposed to the high intensity pump radiation, and therefore, the requirements for its design are relatively simple. Highly reflective gold and silver films can be employed.

The use of a thin etalon as a beam coupler is well suited for a laser device operated under the following conditions. Regardless of the type of phase matching, either the idler beam, the signal beam, or both, are polarized orthogonally to the pump beam. For example, since ZnGeP$_2$ is a positive uniaxial crystal, in type 1 phase matching, the pump beam is ordinary and both the signal and the idler beams are extraordinary beams. Therefore, the OPO of the laser device can be arranged, such that the resonant wave of the signal beam, idler beam (or both) is incident as a p-polarized beam onto the beam coupler, whereas the pump wave is s-polarized. If a plane-parallel plate of transparent optical material is used as a beam coupler, it can be adjusted to the Brewster angle, and minimize reflection losses for the resonant wave to almost zero. This is important for efficient performance of the OPO. At the same time, because the pump wave is s-polarized, it will experience high reflectivity at both surfaces of the plane-parallel plate. A further enhancement to the reflectivity of the beam coupler results from the interference of the pump beam in the plate. The higher the refractive index of the plate material, the higher the reflectivity for the pump wave at each plate surface and therefore, it becomes easier to achieve high reflectivity of the etalon.

It has been determined that when such a beam coupler is made of silicon, the reflectivity for the pump beam can be greater than 97%, with the reflective losses for the oscillating beam being less than 0.5% per pass. Because the surface roughness of a silicon plate can readily be made to be as low as a few Angstroms RMS, there can be virtually no moisture absorption at the surface thereof. Thus, the etalon can have an extremely high optical damage threshold and permit a substantial increase in pumping intensity. Pump beams with intensities of at least 100 MW/cm$^2$ and energy densities of at least 1 J/cm$^2$ can be employed, and the device can be used to direct from the cavity a beam with an intensity of at least about 10 MW/cm$^2$ and an energy density of at least 0.1 J/cm$^2$, at a wavelength between about 3.8 to 11 $\mu$m.

The foregoing improvements in OPOs result in increased conversion efficiency and extension of the tunablility range. In addition, the OPO cavity can be equipped with wavelength selective elements, such as diffraction gratings, prisms and the like, in order to further narrow a spectral line of the OPO output. The inclusion of these elements inevitably increases the oscillation threshold of the OPO, and thus, require increased pump intensity. This had heretofore been undesirably limited by a low optical damage threshold of the components of a conventional OPO. However, because of the increased damage threshold of OPO components in accordance with the invention, the pump intensity can be increased and these elements can be included. Consequently, improved spectral performance in the mid-IR range can be achieved.

In operation, pump laser 15 generates a pump beam 14, which is directed into the optical cavity by reflecting pump beam 14 off thin etalon 16. Etalon 16 is aligned such that the reflected pump beam propagates along or at a small angle to the optical axis of the OPO cavity. Both surfaces of etalon 16 are positioned substantially at the Brewster angle of the resonant signal or idler (or both) beams. Pump beam 14 is S-polarized and the resonant beam(s) are P-polarized with respect to the surfaces of etalon 16. Etalon 16 is preferably formed of material having a high refractive index, such as silicon or germanium, which have refractive indexes of 3.4 and 4.0 respectively.

The higher the refractive index of the etalon material, the higher the reflectivity per surface for the pump beam can be achieved. More specifically, reflectivity R for the S-polarized pump beam is determined by Fresnel formula:

$$R=r^2,$$
$$r=-\sin(\phi-\gamma)/\sin(\phi+\gamma), \quad (1)$$

where $\phi$ and $\gamma$ are the incident and refracted beam angles, respectively, in the plate. $\phi$ and $\gamma$ are related through refractive index n, by Snell's law $$\sin(\phi)=n \sin(\gamma). \qquad (2)$$

$\phi$ is close to the Brewster angle, which is determined by $$\tan(\phi)=n.$$

Therefore, a higher n results in higher reflectivity per surface. For example, at the Brewster angle, R equals 0.71 for silicon.

Furthermore, actual reflectivity of the etalon can be made substantially higher than R if multiple reflections from both sides thereof are considered. As set forth in Born, M, Wolf, E., "Principles of Optics" (Pergamon Press, Oxford, 1968), the maximum reflectance of the etalon $R_{et}$ of thickness d is:

$$R_{et}=4R/((1-R)^2+4R). \qquad (3)$$

This leads to $R_{et}=0.97$ and $R_{et}=0.98$ for silicon and germanium respectively. Higher values of R will lead to still higher maximum etalon reflectivities $R_{et}$.

Additionally, higher values of refractive index lead to better overlap of the reflected beams. For example, FIG. 6 illustrates geometrical beam paths in an etalon placed in the beam at Brewster angle $\phi$. Each subsequently reflected beam is displaced with respect to the previous reflection by:

$$\Delta x=2\ d\ \tan(\gamma)=2\ d\ (n^2+1)^{1/2}/n^2. \qquad (4)$$

Therefore, the higher the index, the less the displacement and, therefore, the more tightly the pump beam can be focused at a given number of interfering reflected beams.

For example, assuming a plate thickness of 0.1 mm and the number of overlapping beams to be at least 10, the beam diameter should be not less than 0.6 mm and 0.5 mm for silicon and germanium respectively. These numbers provide tight enough focusing for many situations, since only 2.8 mJ and 2.0 mJ per 10 nsec long pump pulse is required to achieve intensity of the pump beam of 100 MW/cm$^2$, which is roughly equal or above typical intrinsic damage threshold of mid-IR nonlinear crystals.

The pump laser should preferably have a sufficiently narrow spectral line width for at least two reasons. First, narrow line width of the pump laser facilitates narrowing line widths of the generated beams. Second, reflectivity of the etalon is higher for a narrow line width beam. More specifically, the ratio of the coherence length of the pump laser $1_c$ to the double optical thickness of the etalon 2 $dn/\cos(\gamma)$ determines the maximum number of reflections that can interfere. If a maximum of 10 reflections is assumed, then $$1_c>20\ dn/\cos(\gamma)=20\ d(n^2+1)^{1/2}.$$

This condition is equivalent to the condition that the spectral line width $\Delta v$ of the pump laser is less than $\frac{1}{10}$ of the free spectral range of the etalon (FSR) equal to $c \cdot \cos(\gamma)/2\ dn$, since $c/1_c \sim \Delta v$:

$$\Delta v<0.1\ FSR$$

where c is the speed of light.

For example, if a 0.1 mm thick silicon etalon is considered, the pump laser line width should be less than 1.5 cm$^{-1}$. This condition is satisfied for a majority of fixed wavelength solid state pump lasers such as Nd:YAG or Er:YAG lasers with typical line widths of less than 0.5 cm$^{-1}$, and especially injection seeded solid state lasers with a typical line width on the order of 0.01 cm$^{-1}$.

The thickness of the etalon should preferably be such that at a given incidence angle of the pump beam onto the etalon, which is equal to the Brewster angle for the resonant beam, the reflectivity of the etalon for the pump beam is at its maximum. In practical implementation of the present invention, however, it may be easier to achieve maximum reflectivity by slightly rotating the etalon in the vicinity of the Brewster angle. For example, assuming a 0.1 mm thick silicon plate, rotation by only 1.5° is required to go from a minimum reflection to the maximum reflection. Such a small deviation from the Brewster angle would introduce negligible reflectivity loss of less than 0.25% per surface for the resonant wave. At the same time, reflectivity for the pump beam will increase to 97% when tuned to the maximum.

The etalon should be preferably maintained at constant temperature within the accuracy limits that are common for most laboratory environments, in order to maintain constant optical thickness. For example, since the thermal expansion coefficient of silicon is $2.56 \cdot 10^{-6}$ per 1° C., and the temperature coefficient of refractive index is $160 \cdot 10^{-6}$ per 1° C., every 1° C. of the temperature drift will cause a spectral shift of only 2% of the free spectral range, which is negligible given the finesse of the etalon of less than 10.

The following example is presented for purposes of illustrating aspects and embodiments of the invention only, and is not intended to be construed in a limiting sense.

EXAMPLE

An OPO was built with two 8 mm long ZnGeP$_2$ crystals available from Inrad of Northvale, N.J. Both crystals were cut at an angle of approximately 48° to the crystalline axis and were antireflection coated with a range from 3.5 to 12 μm. Both crystals were mounted onto rotational stages, such that they could be rotated about their vertical axis, with the crystalline axis being horizontal and the crystalline axes of the two crystals form in complementary angles with the optical axes of the cavity.

The front mirror was a highly reflective gold coated mirror. The spectrally selective element was a diffractive grating, with 240 grooves per millimeter, positioned in Littrow configuration. The etalon was formed of single crystal silicon and was 0.1 mm thick and was placed between the crystals and the diffraction grating.

The pumping beam was provided by a flashlamp pumped and electro-optically Q-switched Er:Cr:YSGG laser. The laser was operated at the wavelength of 2.79 μm, with a pulse duration of 70 nsec and an energy per pulse of 5 mJ. The pump beam was collimated by a lens telescope and the oscillation threshold was exceeded by a factor of 1.5 to 2.0, to produce stable oscillation, continuously tunable in the spectral range from 3.8 μm (signal beam) to 11 μm (idler beam). The output energy per pulse was 0.6 mJ in the idler beam at 6 μm, as measured in the zero$^{th}$ order reflection from the diffraction grating. No special measures were required to stabilize the temperature of the silicon etalon. The output spectral line widths of the beams was less than 0.5 cm$^{-1}$, which enabled the resolution of rotational-vibrational lines in the IR absorption spectra of gaseous CO$_2$ and NO. No damage to the etalon was observed. A limit to the pumping intensity was governed by the laser damage to the AR coating on the input face of the nonlinear crystal.

It will thus be seen that the objects set forth above, among those made apparent form the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A laser device including an optical parametric oscillator, having an oscillator resonant cavity with an optical axis and a pump which directs a beam into the cavity, comprising:

a resonant optical cavity having an optical axis;

an optical etalon positioned inside said resonant cavity at or close to the Brewster angle to the optical axis of said cavity;

a pump beam source capable of producing a pump beam incident to the etalon when the laser device is operated;

at least one nonlinear crystal having a crystalline axis and capable of producing parametric oscillations in the cavity, mounted in the optical axis of said cavity in such a manner that the at least one nonlinear crystal can be rotated in the plane containing the optical axis of said cavity and the crystalline axis of the at least one nonlinear crystal and tune a beam exiting the cavity;

the etalon, the at least one nonlinear crystal and the cavity constructed and arranged such that when the pump beam source directs a pump beam having sufficient intensity to produce parametric oscillations in said optical cavity onto said optical etalon, the beam is deflected thereby into and through said at least one crystal substantially along the optical axis of said cavity.

2. The laser device of claim 1, wherein the cavity includes a first reflector having a first reflective surface at a front end of the cavity and a second reflector having a second reflective surface at a rear end of the cavity, said reflectors positioned with their reflecting surfaces normal to the optical axis of the cavity.

3. The laser device of claim 2, wherein said rear reflector includes a mirror highly reflective for signal and idler waves which will be generated when the device is activated.

4. The laser device of claim 2, wherein said rear reflector includes a mirror surface partially reflective for signal and idler waves generated when the device is activated.

5. The laser device of claim 2, wherein said rear reflector includes a mirror surface highly reflective for resonant beams and highly transmissive for nonresonant beams generated when the device is activated.

6. The laser device of claim 1, wherein the cavity includes a diffraction grating, one or more than one prisms and the optical axis of the cavity is defined, in part, by the diffraction grating and prism or prisms.

7. The laser device of claim 6, wherein the grating and optional prism or prisms are arranged in the form of a spectrally selective element which will produce oscillations with a narrow spectral line width of less than 10 cm$^{-1}$ when the laser device is activated.

8. The laser device of claim 1, wherein said pump beam source, etalon, cavity and at least one crystal are constructed and arranged to produce a pumping beam which is polarized perpendicular to the plane containing the pump beam wave vector and a surface normal to the etalon, and such that at least one resonant beam is polarized parallel to said plane when the device is operated.

9. The laser device of claim 1, wherein the thin etalon includes a material with a refractive index greater than about 1.5.

10. The laser device of claim 1, wherein the etalon thickness is less than $0.05 \cdot 1_c/(1+n^2)^{1/2}$ where $1_c$ is the coherence length of the pump beam, and n is the refractive index of the etalon.

11. The laser device of claim 1, wherein when the pump beam is s-polarized, the resonant beam is p-polarized and the etalon is positioned at an angle to the optical axis of said cavity such so that the reflectivity of the etalon for the s-polarized pump beam is at its maximum and, at the same time, said angle is close to the Brewster angle for the p-polarized resonant beam.

12. The laser device of claim 1, wherein the etalon is formed substantially of single crystal silicon.

13. The laser device of claim 1, wherein the etalon is formed substantially of single crystal germanium.

14. The device of claim 1, including at least one nonlinear $ZnGeP_2$ crystal as at least one of the at least one nonlinear crystals.

15. The laser device of claim 1, including a spectrally selective element which will produce oscillations with a narrow spectral line width of less than 10 cm$^{-1}$ when the laser device is activated.

16. The laser device of claim 15, wherein the spectrally selective element includes a diffraction grating placed at grazing incidence to a resonant beam in the cavity and a highly reflective mirror.

17. The laser device of claim 15, wherein the spectrally selective element includes a diffraction grating and at least one prism aligned to expand the beam incident on the diffraction grating before reflection from the diffraction grating.

18. The laser device of claim 1, wherein the spectral line width of the beam output from the device is less than 10 cm$^{-1}$ wide.

19. The laser device of claim 18, wherein said narrow spectral line width is less than 1 cm$^{-1}$ wide.

20. The laser device of claim 1, wherein the etalon has a finesse of less than 10.

21. The laser device of claim 1, wherein the cavity includes a diffraction grating, no prisms and the optical axis of the cavity is defined, in part, by the diffraction grating.

22. A method of producing a laser beam tuned to the mid-IR range, comprising:

providing an optical cavity having a front and back defining an optical axis, at least one optical non-linear crystal on the optical axis, and an etalon within the cavity and aligned with the optical axis;

directing a pump beam at the etalon and reflecting the beam parallel to the optical axis and creating an oscillating beam through the at least one crystal and between the front and back of the cavity;

rotating the crystals to tune the wavelength of the oscillating beam; and directing a laser beam tuned to the mid-IR range from the cavity.

23. The method of claim 22, wherein the beam directed from the cavity has a spectral line width of less than about 10 cm$^{-1}$ wide.

24. The method of claim 22, wherein the beam directed from the cavity has a spectral line width of less than about 1 cm$^{-1}$.

25. The method of claim 22, wherein the beam directed from the cavity has an intensity of at least about 10 MW/cm$^2$ and an energy density of at least about 0.1 J/cm$^2$.

26. The method of claim 22, wherein the pump beam has an intensity of at least 100 MW/cm$^2$ and an energy density of at least J/cm$^2$.

27. The method of claim 22 wherein the etalon is formed of single crystal silicon.

28. The method of claim 22, wherein the etalon is formed of single crystal germanium.

29. The method of claim 22, wherein the beam produced has a wavelength between about 3.8 $\mu$ and 11 $\mu$.

30. The method of claim 22, wherein the etalon has a finesse of less than 10.

* * * * *